US009233444B2

(12) United States Patent
Wiggington

(10) Patent No.: US 9,233,444 B2
(45) Date of Patent: Jan. 12, 2016

(54) ADJUSTABLE KEY BLOCK ASSEMBLIES AND ASSOCIATED METHODS OF ADJUSTING EXTRA LARGE WORKPIECES

(71) Applicant: Toyota Motor Engineering & Manufacturing North America, Inc., Erlanger, KY (US)

(72) Inventor: Mark E. Wiggington, Winchester, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 155 days.

(21) Appl. No.: 14/191,652

(22) Filed: Feb. 27, 2014

(65) Prior Publication Data
US 2015/0239099 A1 Aug. 27, 2015

(51) Int. Cl.
B23Q 3/00 (2006.01)
B25B 5/10 (2006.01)

(52) U.S. Cl.
CPC .... B23Q 3/00 (2013.01); B25B 5/10 (2013.01)

(58) Field of Classification Search
CPC ...................................................... B25B 5/10
USPC ............ 33/638, 641, 643, 644, 645, 549, 577
See application file for complete search history.

(56) References Cited

U.S. PATENT DOCUMENTS

| 814,366 A | 3/1906 | Pertig et al. | |
| 5,064,321 A | 11/1991 | Barnes | |
| 5,121,908 A * | 6/1992 | Shatkus | B25B 1/10 269/243 |
| 5,368,539 A | 11/1994 | Mills et al. | |
| 5,799,398 A | 9/1998 | Amateau et al. | |
| 7,997,312 B2 * | 8/2011 | Van Valkenburg | B27C 5/04 33/638 |
| 2010/0186248 A1* | 7/2010 | Seger | B23B 49/00 33/638 |
| 2014/0363252 A1* | 12/2014 | Wawro | B23Q 3/06 409/225 |
| 2015/0239099 A1* | 8/2015 | Wiggington | B25B 5/10 29/428 |

FOREIGN PATENT DOCUMENTS

GB 927124 5/1963

* cited by examiner

Primary Examiner — Yaritza Guadalupe-McCall
(74) Attorney, Agent, or Firm — Dinsmore & Shohl LLP

(57) ABSTRACT

An adjustable key block assembly includes an outer housing block having an upper face and a lower face. The outer housing includes an elongated table engagement member extending from the lower face arranged and configured to be received within a groove of a table of a milling machine defining a set direction of the adjustable key block assembly. A drive screw is rotatably connected to the outer housing block and extending through a slide member opening in the upper face of the outer housing block. The drive screw defines a drive axis that is offset angularly from the set direction. A center slide member includes a collar portion having a threaded opening extending therethrough that is threadably engaged with the drive screw such that rotation of the drive screw moves the center slide member along the drive axis within the slide member opening. The center slide member further includes an engaging portion that extends upwardly from the collar portion beyond the upper face.

20 Claims, 6 Drawing Sheets

ADJUSTABLE KEY BLOCK ASSEMBLIES AND ASSOCIATED METHODS OF ADJUSTING EXTRA LARGE WORKPIECES

TECHNICAL FIELD

The present specification generally relates to devices for adjusting workpieces and, more particularly, to adjustable key block assemblies and methods of adjusting extra large workpieces using adjustable key block assemblies.

BACKGROUND

Often, numerical control (NC) machines are used in machining workpieces to a desired shape. A workpiece may be placed on a table and machined using a working tool mounted to a spindle. The table and/or working tool may move according to a machining program to produce a desired workpiece shape.

Because the table and/or working tool may be computer controlled, it can be important to have accurate alignment of the workpiece on the table at a desired position and orientation. For extra large workpieces (e.g., weighing greater than one ton), alignment of the workpieces on the table can be difficult to accomplish, particularly by hand.

SUMMARY

In one embodiment, a method of adjusting an extra large workpiece on a table of a milling machine is provided. The method includes positioning an adjustable key block assembly on the table of the milling machine. The adjustable key block assembly includes an outer housing block having an upper face facing away from the table of the milling machine and a lower face facing the table of the milling machine. The outer housing block includes an elongated table engagement member extending from the lower face located within a Y-direction groove of the table of the milling machine defining a set direction of the adjustable key block assembly. A drive screw rotatably connected to the outer housing block and extending through a slide member opening in the upper face of the outer housing block. The drive screw defines a drive axis that is offset angularly from the set direction. A center slide member includes a collar portion having a threaded opening extending therethrough that is threadably engaged with the drive screw such that rotation of the drive screw moves the center slide member along the drive axis within the slide member opening. The center slide member further includes an engaging portion that extends upwardly from the collar portion beyond the upper face. The engaging portion is received by a keyway opening in a base support portion supporting the extra large workpiece. The drive screw is rotated thereby moving the center slide member along the drive axis and applying a force within the keyway opening to the base support portion sufficient to move the extra large workpiece.

In another embodiment, an adjustable key block assembly includes an outer housing block having an upper face and a lower face. The outer housing includes an elongated table engagement member extending from the lower face arranged and configured to be received within a groove of a table of a milling machine defining a set direction of the adjustable key block assembly. A drive screw is rotatably connected to the outer housing block and extending through a slide member opening in the upper face of the outer housing block. The drive screw defines a drive axis that is offset angularly from the set direction. A center slide member includes a collar portion having a threaded opening extending therethrough that is threadably engaged with the drive screw such that rotation of the drive screw moves the center slide member along the drive axis within the slide member opening. The center slide member further includes an engaging portion that extends upwardly from the collar portion beyond the upper face.

In another embodiment, a method of assembling an adjustable key block assembly is provided. The method includes inserting a drive screw through a slide member opening in an outer housing block by inserting the drive screw through side openings in the outer housing block. A center slide member is threadably connected to the drive screw at a location within the slide member opening to define a drive axis such that rotation of the drive screw moves the center slide member along the drive axis. The outer housing block is provided with an elongated table engagement member extending from the lower face arranged and configured to be received within a groove of a table of a milling machine defining a set direction of the adjustable key block assembly. The drive axis is offset from the set direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to adjustable key block assemblies and methods of adjusting extra large workpieces using adjustable key block assemblies. As used herein, the term "extra large workpieces" refers to workpieces having a weight of over one metric ton, such as about five metric tons or more, such as about 10 metric tons or more. The adjustable key block assemblies include a center slide member that is screw driven providing a mechanical advantage. By turning the screw, the center slide member moves along the screw at an angle to a set direction which can be defined by a long axis of a table engagement member of the adjustable key block. In other words, the center slide member can move diagonally in both X and Y-directions when the table engagement member is affixed to a table of a milling machine. The center slide member can engage a keyway opening in a base support member that supports the extra large workpiece for adjusting position of the extra large workpiece on the table of the milling machine.

Figure 1:
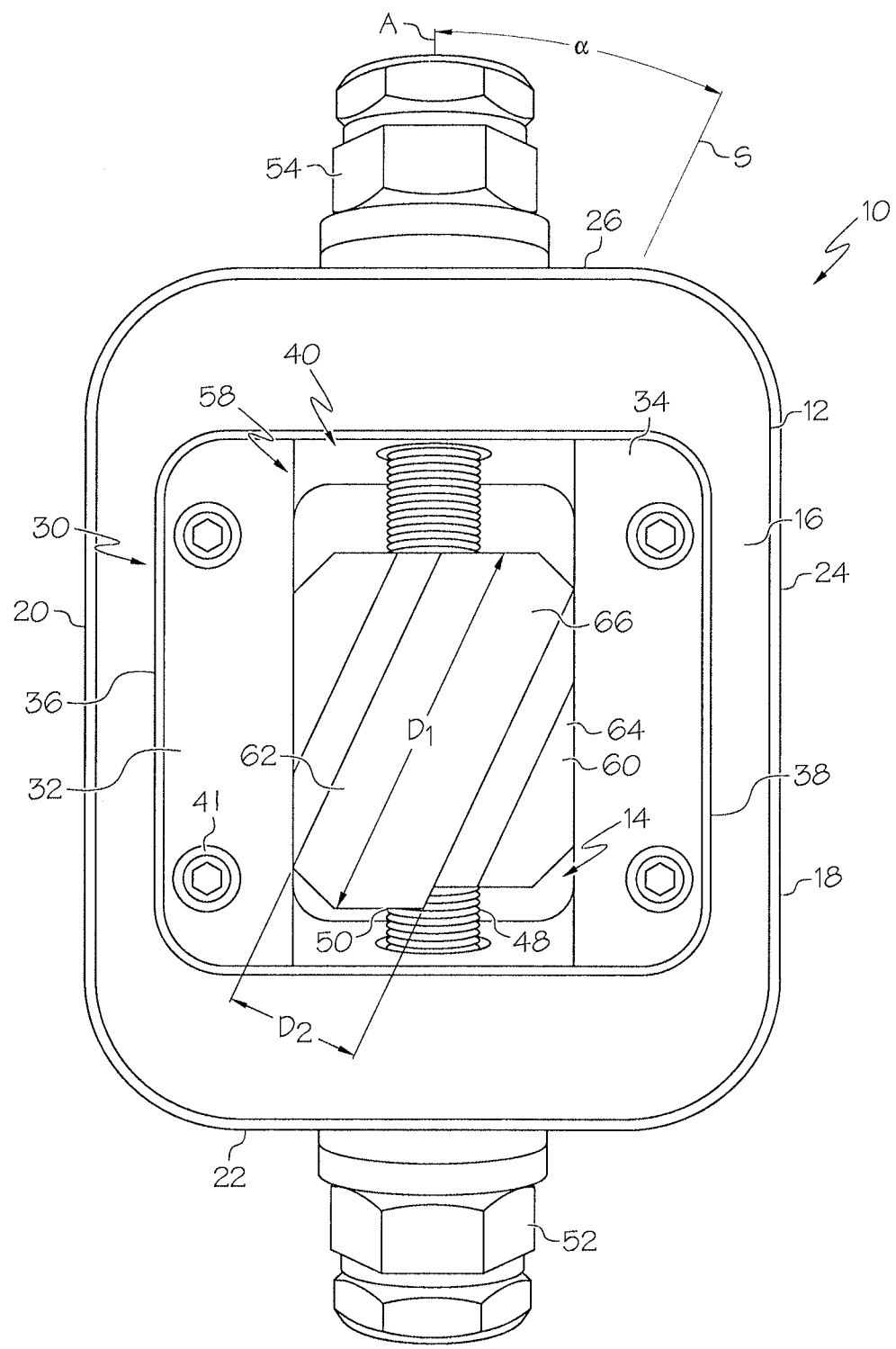
FIG. 1 is a top view of an adjustable key block assembly according to one or more embodiments described herein.

Referring to FIG. 1, an adjustable key block assembly 10 includes an outer housing block 12 having a slide member opening 14 therein. As can be seen, the outer housing block 12 is somewhat box-like in shape having an upper face 16, a lower face 18 (FIG. 2) and sides 20, 22, 24 and 26. A guide member assembly 30 is located in the slide member opening 14. The guide member assembly 30 includes gib members 32 and 34 that are located at opposite edges 36 and 38 of the slide member opening 14. The gib members 32 and 34 are shaped to be received flush against the opposite edges 36 and 38, leaving a gap 40 therebetween. The gib members 32 and 34 may be fixedly connected to the outer housing block 12 using, for example, fasteners 41 or any other suitable method, such as by welding.

A drive screw 48 extends through the slide member opening 14. The drive screw 48 includes threads 50 and may be any one of single start or multiple start configurations. The drive screw 48 is rotatably connected to the outer housing block 12, extending through opposite sides 22 and 26. The drive screw 48 may be rotatably connected to the outer housing block 12 using lock nuts 52 and 54 or any other suitable fastener secured at ends of the drive screw 48. As will be described in greater detail below, turning the lock nut 52 is used to rotate the drive screw 48.

Figure 2:
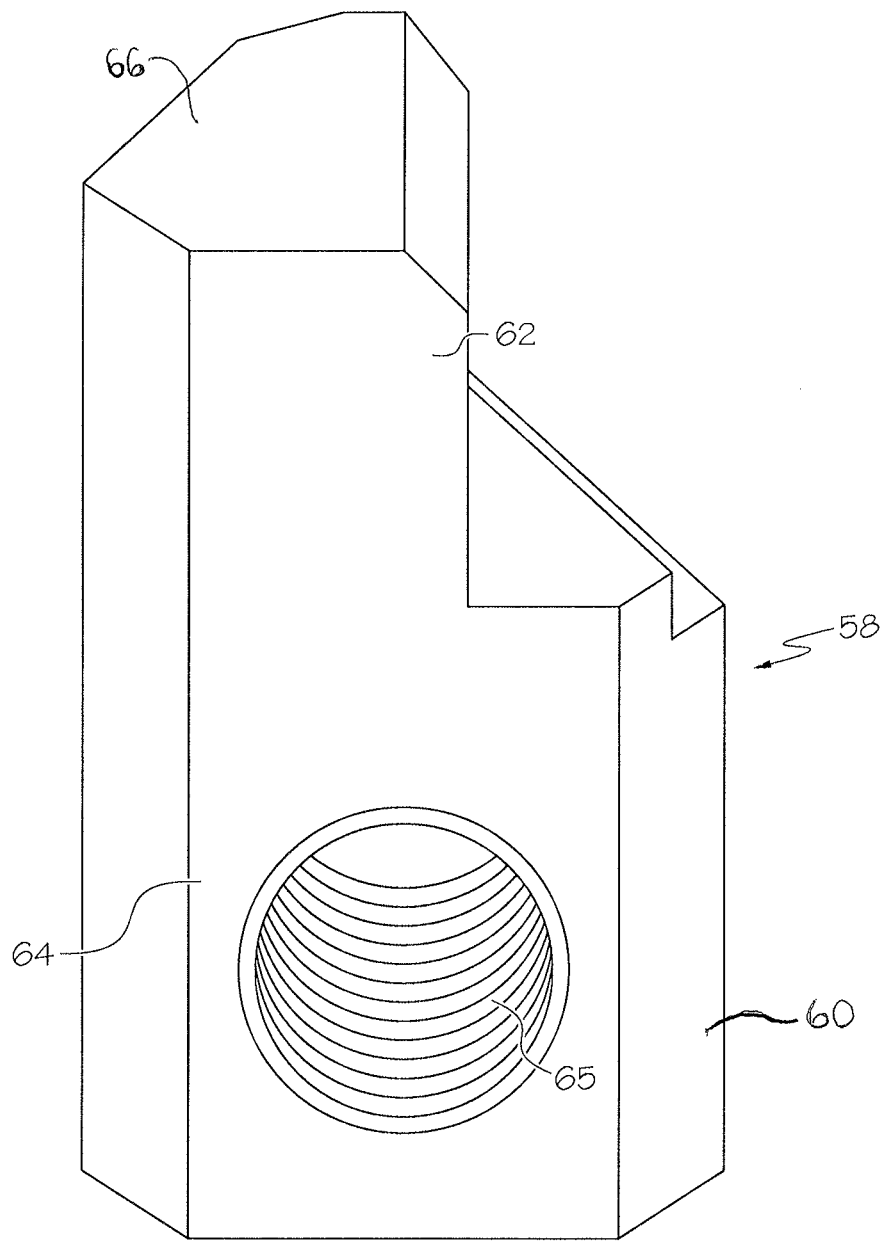
FIG. 2 is a side view of a of a center slide member for use in the adjustable key block assembly of FIG. 1.

A center slide member 58 is threadably connected to the drive screw 48 and is located in the slide member opening 14. Referring also to FIG. 2, the center slide member 58 includes a collar portion 60 and an engaging portion 62 that extends upwardly from and is integral with the collar portion 60. The collar portion 60 includes a somewhat box-shaped body 64 that is sized to fit between the gib members 32 and 34. A threaded opening 65 extends through the body 64 and includes internal threads that mate with the threads 50 of the drive screw 48. The engaging portion 62 extends upwardly from the collar portion 60 to an end surface 66 located above the upper face 16.

As can be seen in FIG. 1, the widthwise cross-sectional area of the engaging portion 62 is less than the widthwise cross-sectional area of the collar portion 60. The widthwise cross sectional area of the engaging portion has a long dimension $D_1$ and a short dimension $D_2$ thereby providing a somewhat elongated end surface 66. The long dimension $D_1$ of the engaging portion 62 may be aligned parallel with a set direction S and Y-axis of the milling machine during use. In this orientation, as illustrated by FIG. 1, the drive screw 48 has a drive axis A that is offset angularly from the set direction S. The offset α may be between about 15 and about 45 degrees, such as about 25 degrees. This offset α provides some motion transverse to the set direction for the center slide member 58 as it moves along the length of the drive screw 48.

Figure 3:
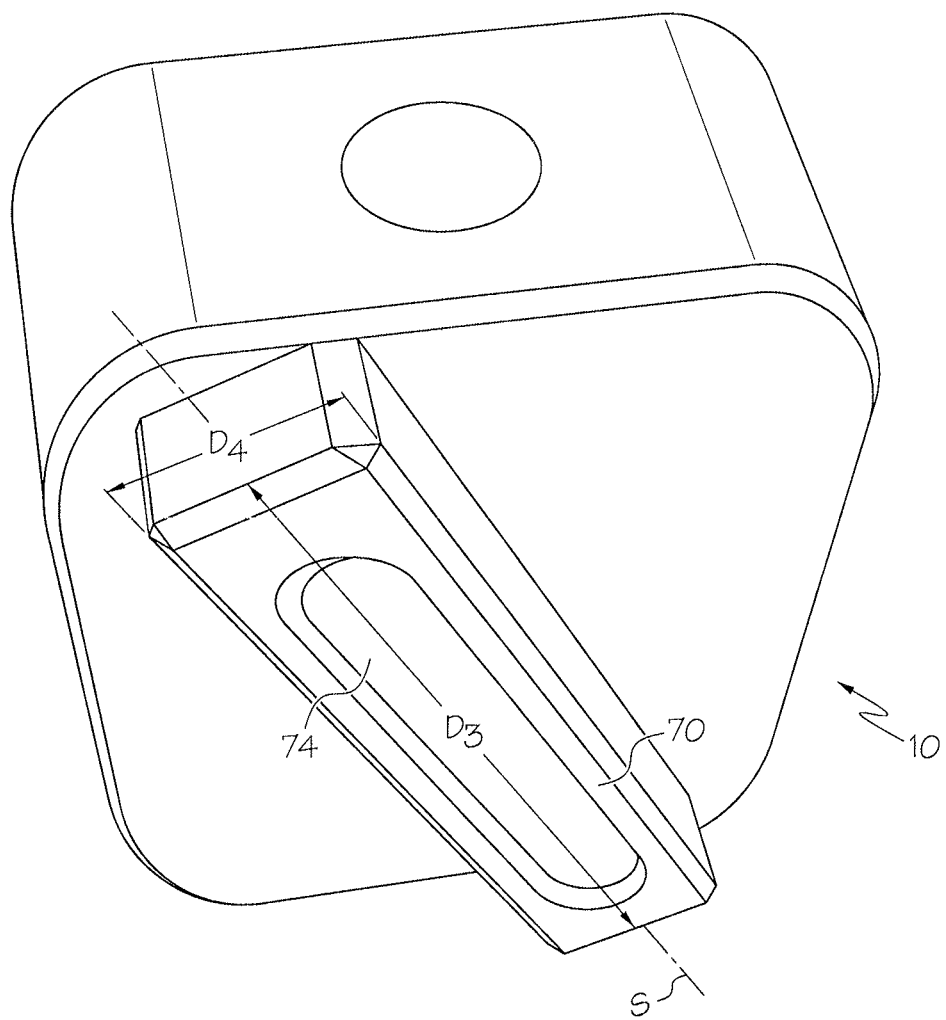
FIG. 3 is a bottom, perspective view of the adjustable key block assembly of FIG. 1.

Referring to FIG. 3, the adjustable key block assembly 10 includes a table engagement member 70 projecting from the lower face 18 of the outer housing block 12. As can be seen, the table engagement member 70 has a long dimension $D_3$ and a short dimension $D_4$ that is less than the long dimension $D_3$. The long dimension $D_3$ defines the set direction S and can extend generally in the Y-direction (or X-direction) once connected to a table of the milling machine. The table engagement member 70 can be used to fix the adjustable key block assembly 10 in a desired orientation on the table of the milling machine. In some embodiments, the table engagement member 70 may include an opening or recess 74 that can be used to receive a mating projection (or vice versa) to affix the table engagement member 70 to a surface. In other embodiments, no recess or projection may be provided on the table engagement member 70.

Figure 4:
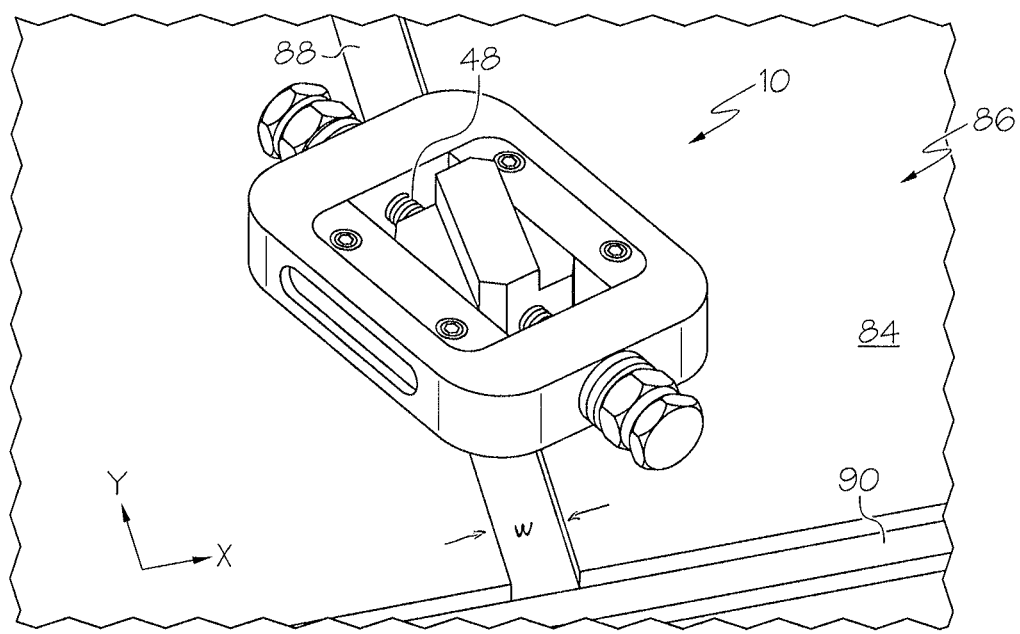
FIG. 4 illustrates the adjustable key block assembly of FIG. 1 received by a table of a milling machine.

Referring to FIG. 4, the adjustable key block assembly 10 is illustrated received on a table 84 of a milling machine, generally labeled element 86. The table 84 includes a number of Y-direction grooves 88 and X-direction grooves 90. The table engagement member 70 that projects from the lower face 18 of the outer housing block 12 has the short dimension $D_4$ less than a width W of the grooves 88 and 90 that is sized to be received within the grooves 88 and 90 at a desired location. The grooves 88 and 90 can be used to prevent rotation and movement of the adjustable key block assembly 10 in the direction transverse to the running direction of the particular groove 88, 90.

Figure 5:
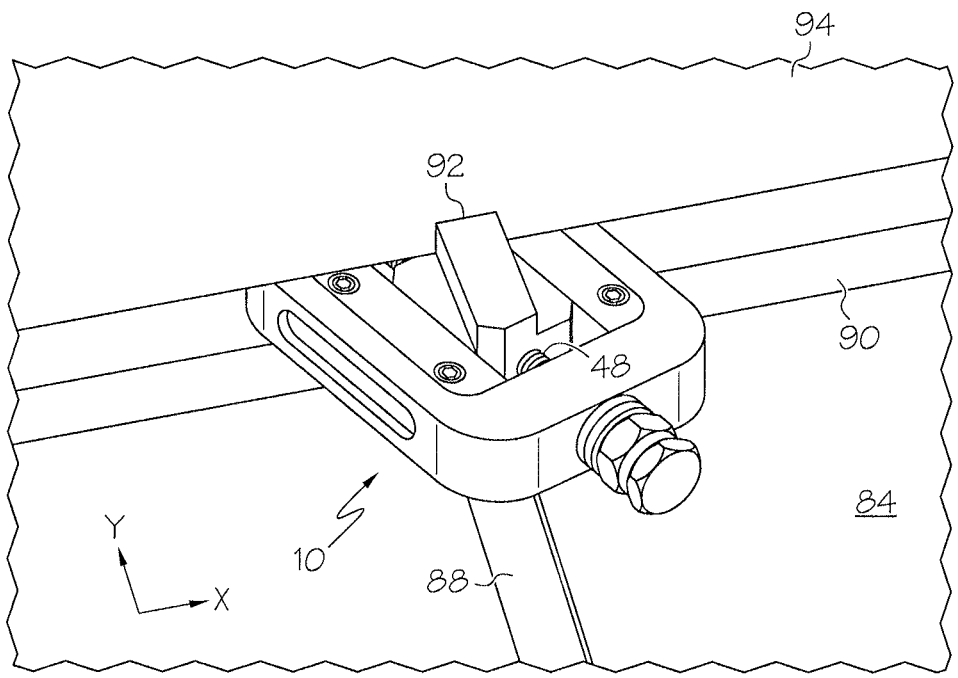
FIG. 5 illustrates the adjustable key block assembly of FIG. 1 positioned within a keyway opening of an extra large workpiece.

Referring now to FIG. 5, the adjustable key block assembly 10 can be slid into a keyway opening 92 in a base support portion 94 that can support the extra large workpiece thereon for adjusting position of the extra large workpiece on the table 84 of the milling machine 86. In some embodiments, the base support portion 94 may be part of the extra large workpiece itself or it may be separate. Due to the parallel alignment between the long dimension $D_1$ of the engaging portion 62, the set direction S and the Y-direction, the engaging portion 62 can be aligned with the keyway opening 92, which also extends along its axis L lengthwise in the Y-direction. As indicated above, while the set direction S and keyway axis L are illustrated aligned in the Y-direction, the axis A of the drive screw 48 is offset angularly the amount α (e.g., between about 15 degrees and about 45 degrees, such as about 25 degrees) from the set direction S.

Figure 6:
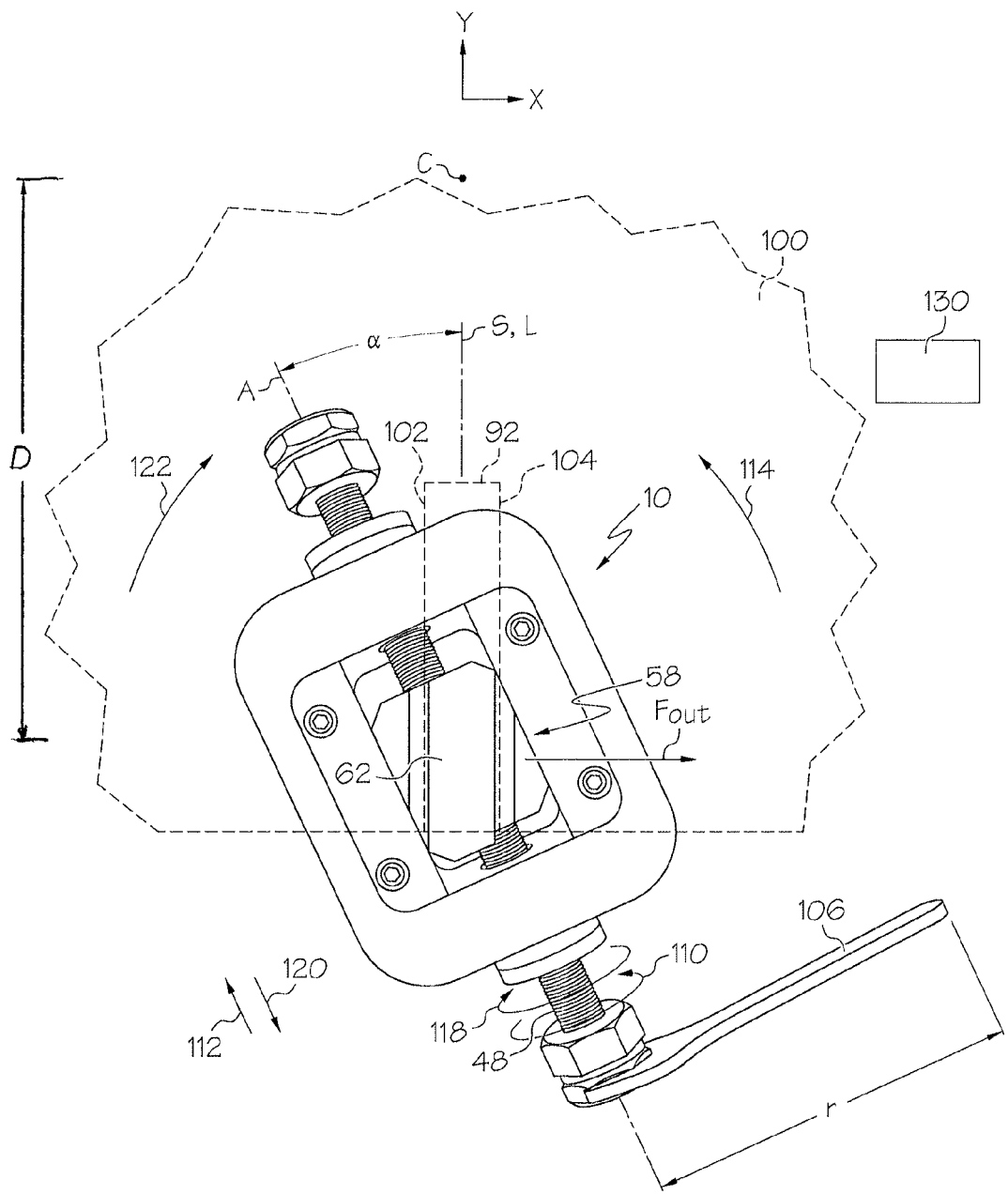
FIG. 6 illustrates operation of the adjustable key block assembly according to one or more embodiments described herein.

Referring to FIG. 6, operation of the key block assembly 10 to adjust the X-axis position of the extra large workpiece 100 is illustrated diagrammatically. As can be seen, the axis A of the drive screw 48 is offset angularly the amount α from the set direction S, keyway axis L and Y-direction. As the center slide member 58 is moved along the drive screw 48 using, for example, a wrench 106 or other suitable tool, the engaging portion 62 of the center slide member 58 engages one of the sidewalls 102 and 104 of the keyway opening 92 depending on the direction of rotation of the drive screw 48.

Use of the drive screw 48 provides a mechanical advantage that facilitates adjustment of the extra large workpiece 100. The mechanical advantage MA of the drive screw is defined as the ratio of axial output force $F_{out}$ applied by the drive screw on a load to the rotational force $F_{in}$ applied to the drive screw to turn. For an ideal screw (for illustration), the work done on the drive screw by the input force turning it is equal to the work done by the drive screw on the load force:

$$W_{in} = W_{out}.$$

Work is equal to the product of the force by distance it acts r. For example, r may be the length of the wrench 106 (e.g., greater than about one foot, such as greater than about two feet, such as greater than about three feet). Thus, the work done in one complete turn of the drive screw is given by:

$$W_{in} = \frac{2\pi r}{l}$$

where l is the lead distance, which is the distance along the screw's axis that is covered by one complete rotation of the screw (360°). In some embodiments, the lead may be no more than about three mm, such as about 2.5 mm (e.g., for an M20 drive screw).

The work done on the load is:

$W_{out} = lF_{out}.$

Thus, the mechanical advantage MA is equal to the distance ratio:

$$MA = \frac{F_{out}}{F_{in}} = \frac{2\pi r}{l}.$$

As can be seen, the mechanical advantage MA of the drive screw depends on the lead l. The smaller the distance between threads, the larger the mechanical advantage MA.

Thus for a relatively small input force, such as can be manually applied using the wrench 106, the position of the extra large workpiece 100 can be adjusted in a controllable fashion. For example, turning the wrench 106 clockwise in the direction of arrow 110 can move the center slide member 58 in the direction of arrow 112, engaging sidewall 104. With the output force $F_{out}$ applied a distance D from the center of mass C, the extra large workpiece 100 can be turned counterclockwise in the direction of arrow 114 thereby adjusting the X-axis alignment of the extra large workpiece 100 on the table 84. Similarly, turning the wrench 106 counterclockwise in the direction of arrow 118 can move the center slide member 58 in the direction of arrow 120, engaging sidewall 102. In this example, the extra large workpiece 100 can be turned clockwise in the direction of arrow 122. In some embodiments, relatively fine adjustments can be made, such as moving the center slide member 58 in the X-direction less than about 0.1 mm, such as 0.01 mm to adjust the X-axis (or Y-axis) position of the extra large workpiece 100. In some embodiments, a position gauge 130 may be used in positioning the extra large workpiece 100.

Figure 7:
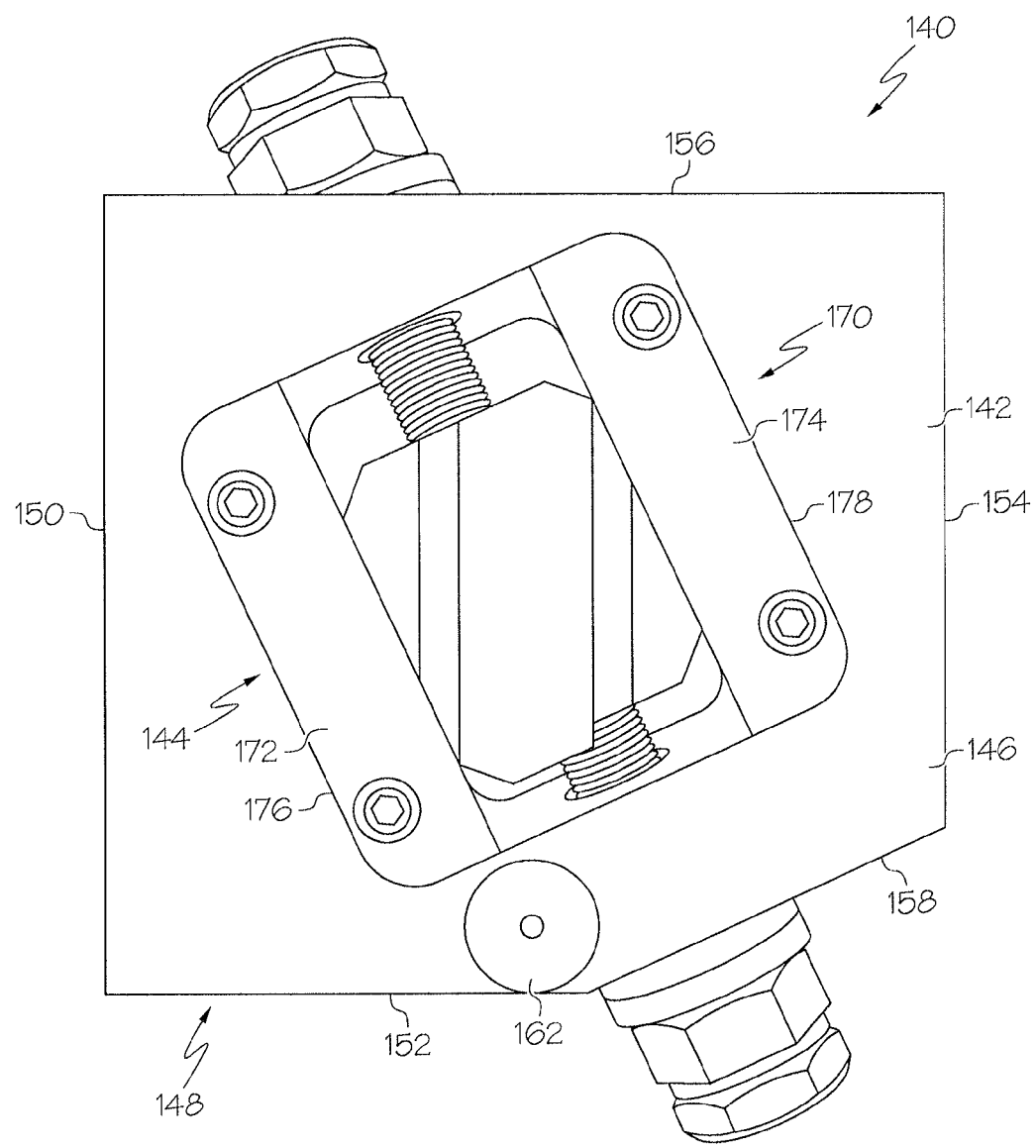
FIG. 7 illustrates another embodiment of an adjustable key block assembly according to one or more embodiments described herein.

Referring to FIG. 7, another embodiment of an adjustable key block assembly 140 includes an outer housing block 142 having a slide member opening 144 therein. As can be seen, the outer housing block 142 is somewhat box-like in shape having an upper face 146, a lower face 148 and sides 150, 152, 154 and 156. In this embodiment, joining sides 150 and 152 is a truncated corner 158. Extending upwardly from the upper face 146 is a positioning projection 162. The positioning projection 162 may be used in positioning the adjustable key block assembly 140 relative to a base support member that supports an extra large workpiece. A guide member assembly 170 is located in the slide member opening 144, as described above. The guide member assembly 170 includes gib members 172 and 174 that are located at opposite edges 176 and 178 of the slide member opening 144. The gib members 172 and 174 may be fixedly connected to the outer housing block 142 using, for example, fasteners 180 or any other suitable method, such as by welding.

The above-described adjustable key block assemblies allow for adjustment of extra large workpieces (e.g., up to 10 metric tons or more) on tables of milling machines with relatively minimal physical effort. The adjustable key block assemblies utilize a mechanical advantage using a drive screw that is used to drive a center slide member along a drive axis within a keyway opening in a base support portion supporting the extra large workpiece. The drive axis has an angularly offset arrangement that is offset from the set direction of the key block assembly and Y-axis of the milling machine. Such an offset arrangement can allow for relatively fine adjustments of the extra large workpiece during a positioning operation. Any suitable methods may be used to form the adjustable key block assembly 10, such as machining, casting, etc. The adjustable key block assembly may be formed of any suitable materials, such as metals (e.g., steel, iron, etc.).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of adjusting an extra large workpiece on a table of a milling machine, the method comprising:
   positioning an adjustable key block assembly on the table of the milling machine, the adjustable key block assembly comprising:
   an outer housing block having an upper face facing away from the table of the milling machine and a lower face facing the table of the milling machine, the outer housing block including an elongated table engagement member extending from the lower face located within a Y-direction groove of the table of the milling machine defining a set direction of the adjustable key block assembly;
   a drive screw rotatably connected to the outer housing block and extending through a slide member opening in the upper face of the outer housing block, the drive screw defining a drive axis that is offset angularly from the set direction;
   a center slide member including a collar portion having a threaded opening extending therethrough that is threadably engaged with the drive screw such that rotation of the drive screw moves the center slide member along the drive axis within the slide member opening, the center slide member further including an engaging portion that extends upwardly from the collar portion beyond the upper face, the engaging portion being received by a keyway opening in a base support portion supporting the extra large workpiece; and
   rotating the drive screw thereby moving the center slide member along the drive axis and applying a force within the keyway opening to the base support portion sufficient to move the extra large workpiece.

2. The method of claim 1, wherein the extra large workpiece has a weight of over one metric ton.

3. The method of claim 1, wherein the step of rotating the drive screw comprises rotating a lock nut threadably connected to the drive screw.

4. The method of claim 3, wherein the lock nut is rotated using a wrench.

5. The method of claim 4, wherein a length of the wrench is greater than about one foot.

6. The method of claim 1 comprising positioning the engaging portion of the center slide member within the keyway opening with the table engagement member received within the Y-direction groove.

7. The method of claim 1, wherein the drive axis is offset angularly from the set direction by between about 15 and about 45 degrees.

8. The method of claim 1, wherein the drive axis is offset angularly from the set direction by 25 degrees.

9. An adjustable key block assembly comprising:
   an outer housing block having an upper face and a lower face, the outer housing including an elongated table engagement member extending from the lower face arranged and configured to be received within a groove of a table of a milling machine defining a set direction of the adjustable key block assembly;

a drive screw rotatably connected to the outer housing block and extending through a slide member opening in the upper face of the outer housing block, the drive screw defining a drive axis that is offset angularly from the set direction;

a center slide member including a collar portion having a threaded opening extending therethrough that is threadably engaged with the drive screw such that rotation of the drive screw moves the center slide member along the drive axis within the slide member opening, the center slide member further including an engaging portion that extends upwardly from the collar portion beyond the upper face.

10. The adjustable key block assembly of claim 9 further comprising a pair of gib members at opposite edges of the slide member opening, the center slide member located between the pair of gib members.

11. The adjustable key block assembly of claim 9, wherein the drive screw has a lead distance of no more than about three mm.

12. The adjustable key block assembly of claim 9 further comprising a lock nut threadably attached to an end of the drive screw at a location outside the outer housing block.

13. The adjustable key block of claim 9, wherein the engaging portion has a widthwise cross-sectional area having a long dimension and a short dimension providing an elongated end surface.

14. The adjustable key block of claim 13, wherein the long dimension of the engaging portion is aligned substantially parallel with the set direction.

15. A method of assembling an adjustable key block assembly, the method comprising:

inserting a drive screw through a slide member opening in an outer housing block by inserting the drive screw through side openings in the outer housing block;

threadably connecting a center slide member to the drive screw at a location within the slide member opening to define a drive axis such that rotation of the drive screw moves the center slide member along the drive axis; and providing the outer housing block with an elongated table engagement member extending from the lower face arranged and configured to be received within a groove of a table of a milling machine defining a set direction of the adjustable key block assembly, wherein the drive axis is offset from the set direction.

16. The method of claim 15 further comprising providing a pair of gib members at opposite edges of the slide member opening, the center slide member located between the pair of gib members.

17. The method of claim 15, wherein the drive screw has a lead distance of no more than about three mm.

18. The method of claim 15 further comprising threadably attaching a lock nut to an end of the drive screw at a location outside the outer housing block.

19. The method of claim 15, wherein an engaging portion of the center slide member has a widthwise cross-sectional area having a long dimension and a short dimension providing an elongated end surface.

20. The method of claim 19, wherein the long dimension of the engaging portion is aligned substantially parallel with the set direction.

* * * * *